US012722140B2

(12) United States Patent
Dyer et al.

(10) Patent No.: US 12,722,140 B2
(45) Date of Patent: Sep. 1, 2026

(54) SYSTEMS AND METHODS FOR PURIFYING SOLVENTS

(71) Applicant: Fujifilm Electronic Materials U.S.A., Inc., N. Kingstown, RI (US)

(72) Inventors: Stephen Earl Dyer, East Greenwich, RI (US); Brendan Thomas Lane, Middleborough, MA (US); Patrick Adams Mahoney, Sr., North Kingstown, RI (US)

(73) Assignee: Fujifilm Electronic Materials U.S.A., Inc., Kingstown, RI (US)

( * ) Notice: Subject to any disclaimer, the term of this patent is extended or adjusted under 35 U.S.C. 154(b) by 666 days.

(21) Appl. No.: 18/142,718

(22) Filed: May 3, 2023

(65) Prior Publication Data

US 2023/0330627 A1 Oct. 19, 2023

Related U.S. Application Data

(62) Division of application No. 17/004,130, filed on Aug. 27, 2020, now Pat. No. 11,679,375.

(60) Provisional application No. 62/895,198, filed on Sep. 3, 2019.

(51) Int. Cl.

| | |
|---|---|
| ***B01J 20/00*** | (2006.01) |
| ***B01D 39/16*** | (2006.01) |
| ***B01J 20/26*** | (2006.01) |
| ***B01J 20/28*** | (2006.01) |

(52) U.S. Cl.

CPC ............ *B01J 20/261* (2013.01); *B01D 39/16* (2013.01); *B01J 20/2808* (2013.01); *B01J 20/28083* (2013.01); *B01D 2201/30* (2013.01); *B01D 2253/308* (2013.01); *B01D 2311/2512* (2022.08); *B01J 2220/445* (2013.01); *B01J 2220/603* (2013.01)

(58) Field of Classification Search

CPC .................. B01J 20/261; B01J 20/2808; B01J 20/28083; B01J 2220/445; B01J 2220/603; B01D 39/16; B01D 2311/2512; B01D 220/30; B01D 2253/308

USPC .......................................................... 502/402

See application file for complete search history.

(56) References Cited

U.S. PATENT DOCUMENTS

| | | | |
|---|---|---|---|
| 2007/0084792 | A1 | 4/2007 | Mullee |
| 2010/0126934 | A1 | 5/2010 | Nakazato et al. |
| 2015/0144557 | A1 | 5/2015 | Ly et al. |

(Continued)

FOREIGN PATENT DOCUMENTS

| | | | |
|---|---|---|---|
| JP | 2013-218308 | A | 10/2013 |
| JP | 2016-073922 | | 5/2016 |

(Continued)

OTHER PUBLICATIONS

International Search Report and Written Opinion of the International Searching Authority for International Application No. PCT/US2020/048162 by Examiner Blaine R. Copenheaver, dated Dec. 7, 2020.

(Continued)

*Primary Examiner* — James E Mcdonough
(74) *Attorney, Agent, or Firm* — Fish & Richardson P.C.

(57) ABSTRACT

The present disclosure is directed to methods and systems of purifying solvents. The purified solvents can be used for cleaning a semiconductor substrate in a multistep semiconductor manufacturing process.

18 Claims, 1 Drawing Sheet

(56) References Cited

U.S. PATENT DOCUMENTS

| | | | | |
|---|---|---|---|---|
| 2020/0156005 | A1 | 5/2020 | Cole-Yocom et al. | |
| 2020/0171434 | A1* | 6/2020 | Kamimura ............ | B01D 71/32 |

FOREIGN PATENT DOCUMENTS

| | | |
|---|---|---|
| JP | 2016-075920 | 5/2016 |
| TW | 201906659 | 2/2019 |
| WO | WO 2017/188296 | 11/2017 |
| WO | WO 2019/044871 | 3/2019 |

OTHER PUBLICATIONS

Office Action in Chinese Appln. No. 202080062031.3, dated Feb. 11, 2023, 25 pages (with English translation).

Search Report in Singapore Appln. No. 11202201139W, mailed on Jul. 4, 2023, 7 pages.

Supplementary European Search Report issued by the European Patent Office for Application No. EP 20 86 0953, dated Jun. 28, 2022.

Office Action in Chinese Appln. No. 202080062031.3, dated Jul. 26, 2023, 34 pages (with English translation).

Office Action in Chinese Appln. No. 202080062031.3, dated May 28, 2024, 32 pages (with English translation).

Office Action in Chinese Appln. No. 202080062031.3, dated Nov. 1, 2023, 30 pages (with English translation).

Office Action in Taiwan Appln. No. 109129731, dated Apr. 11, 2024, 21 pages (with English translation).

Office Action in Israel Appln. No. 290395, dated Nov. 28, 2024, 4 pages (with English translation).

Office Action in Japanese Appln. No. 2022-514622, dated Oct. 29, 2024, 11 pages (with English translation).

* cited by examiner

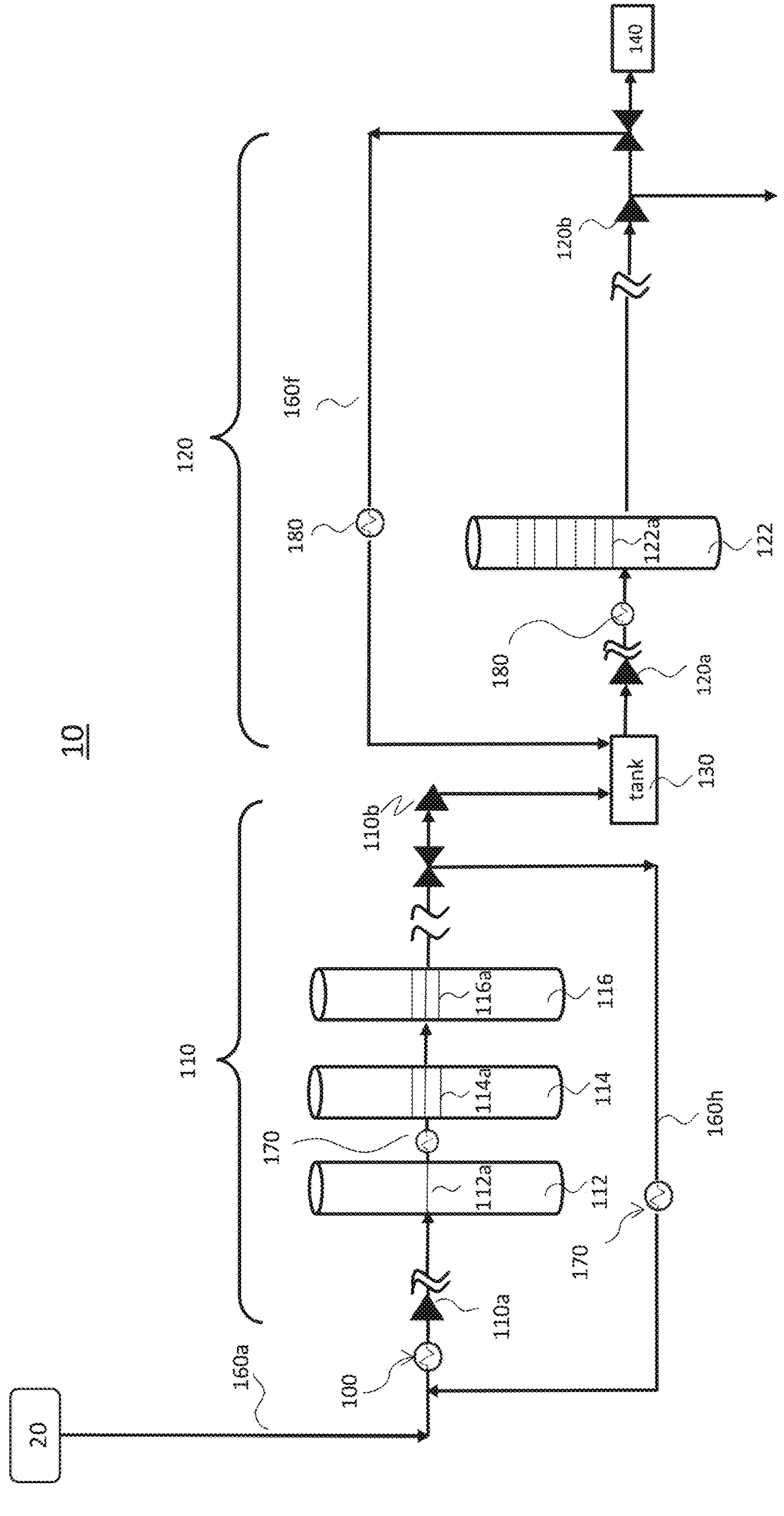
10
20
160a
100
110a
110
112
112a
170
114
114a
116
116a
160h
170
110b
tank
130
120
120a
180
122
122a
180
160f
120b
140

SYSTEMS AND METHODS FOR PURIFYING SOLVENTS

CROSS-REFERENCE TO RELATED APPLICATIONS

The present application is a divisional of U.S. Utility application Ser. No. 17/004,130, filed on Aug. 27, 2020, which claims priority to U.S. Provisional Application Ser. No. 62/895,198, filed on Sep. 3, 2019. The contents of the earlier applications are hereby incorporated by reference in their entirety.

FIELD OF THE DISCLOSURE

The present disclosure relates to systems and methods for purifying solvents (e.g., organic solvents). In particular, the present disclosure relates to systems and methods that can be used to obtain organic solvents having a high purity, a low on wafer particle count, and/or a low on wafer metal count.

BACKGROUND OF THE DISCLOSURE

The semiconductor industry has achieved rapid improvements in integration density of electronic components, which are arisen from continuous reductions in the component size. Ultimately, more of the smaller components are afforded to be integrated into a given area. These improvements are mostly due to the development of new precision and high resolution processing techniques.

During the manufacturing of high resolution integrated circuits (ICs), various processing liquids will come into contact with a bare wafer or a film-coated wafer. For example, the fabrication of a fine metal interconnection typically involves a procedure of coating a base material with a pre-wetting liquid before the base material is coated with a composite liquid to form a resist film. These processing liquids, containing proprietary ingredients and various additives, are known to be a source of contamination of IC wafer.

One can speculate that even if a trace amount of contaminants is mixed into these chemical liquids, such as a wafer pre-wetting liquid or a developer solution, the resulting circuit patterns may have defects. It is known that the presence of very low levels of metal impurities, as low as 1.0 ppt, interferes with the performance and stability of semiconductor devices. And depending on the kind of metallic contaminants, oxide property can deteriorate, inaccurate patterns can be formed, electrical performance of semiconductor circuits can be impaired, which eventually adversely impact manufacturing yields.

The contamination of impurities, such as metal impurities, fine particles, organic impurities, moisture, and the like, can be inadvertently introduced in a chemical liquid during various stages of the manufacturing of the chemical liquid. Examples include a case where impurities are presented in a raw material, or a by-product generated or an unreacted reactant remained when the chemical liquid is manufactured, or foreign matters eluded or extracted from the surface of the manufacturing apparatus or from a container equipment, reaction vessels, or the like used in transporting, storing or reacting. Hence, a reduction or removal of insoluble and soluble contaminants from these chemical liquids used for the production of highly precise and ultra-fine semiconductor electronic circuits is a basic assurance of producing defective-free ICs.

In this respect, it is imperative to significantly improve and to rigorously control the standard and quality of chemical liquid manufacturing processes and systems in order to form high purity chemical liquids, which are indispensable in the fabrication of ultra-fine and immensely precise semiconductor electronic circuits.

SUMMARY OF THE DISCLOSURE

Accordingly, to form highly precise integrated circuits, the demands for ultra-pure chemical liquids, and the quality improvement and control of theses liquids become very critical. Specific key parameters targeted for quality improvement and control include: liquid and on-wafer metal reduction, liquid and on-wafer particle count reduction, on-wafer defect reduction, and organic contaminant reduction. All of these key parameters are shown to be impacted by a requisite preparation of a purification system and a proper design of a purification process.

In view of the above, the present disclosure is to provide particularly a purification system and a method of purifying a solvent (e.g., an organic solvent) using the same for preparing a solvent targeted for semiconductor manufacturing, in which an ultra-pure solvent is produced with the number of particulates and the amount of metallic impurities in the solvent managed within predetermined ranges and without the generation or introduction of unknown and unwanted substances. Hence, the occurrence of residue and/or particle defects is suppressed and the yield of semiconductor wafer is improved. In addition, the inventors found unexpectedly that purifying a solvent using a relatively large number of filters having a relatively small average pore size that are arranged in parallel can result in a process having a relatively high flow rate (e.g., higher than that of a conventional method in which filters having a relatively small average pore sizes are arranged in series but not in parallel), which in turn increases the productivity the purification system.

In one aspect, the disclosure features a method of purifying an organic solvent that includes passing the organic solvent through a first filter unit and a second filter unit downstream of the first filter unit to obtain a purified organic solvent. The first filter unit includes a first housing and at least one first filter in the first housing, and the first filter includes a filtration medium having a first average pore size. The second filter unit includes a second housing and at least two second filters in the second housing, the at least two second filters are arranged in the second housing in parallel, and each of the second filters independently includes a filtration medium having a second average pore size. The number of the first filter in the first filter unit is smaller than the number of the second filters in the second filter unit, and the first average pore size is larger than the second average pore size.

In another aspect, the disclosure features a system that includes a first filter unit and a second filter unit downstream of and in fluid communication with the first filter unit. The first filter unit includes a first housing and at least one first filter in the first housing, and the first filter includes a filtration medium having a first average pore size. The second filter unit includes a second housing and at least two second filters in the second housing, the at least two second filters are arranged in the second housing in parallel, and each of the second filters independently includes a filtration medium having a second average pore size. The number of the first filter in the first filter unit is smaller than the number of the second filters in the second filter unit, and the first average pore size is larger than the second average pore size.

Embodiments can include on or more of the following features.

In some embodiments, the methods described herein can further include passing the organic solvent through a third filter unit disposed between the first and second filter units, in which the third filter unit includes a third housing and at least one third filter in the third housing, the third filter includes a filtration medium having a third average pore size, and the filtration medium in the third filter includes an ion exchange membrane.

In some embodiments, the methods described herein can further include passing the organic solvent exiting the second filer unit to a storage tank. In some embodiments, the methods described herein can further include recirculating the organic solvent by moving the organic solvent from the storage tank to the first filter unit and passing the organic solvent through the first and second filter units. In some embodiments, the methods described herein can further include passing the organic solvent through a fourth filter unit disposed downstream of the second filter unit, in which the fourth filter unit includes a fourth housing and at least two fourth filters in the fourth housing, the at least two fourth filters are arranged in the fourth housing in parallel, and each of the fourth filters independently includes a filtration medium having a fourth average pore size.

In some embodiments, the methods described herein can further include recirculating the organic solvent by moving the organic solvent exiting the fourth filter unit to the storage tank and subsequently passing the organic solvent through the fourth filter unit. In some embodiments, the methods described herein can further include moving the purified solvent to a packaging station disposed downstream of the fourth filter unit.

In some embodiments, passing an organic solvent is performed at a flow rate of from about 25 to about 170 L/min.

In some embodiments, the first filter unit includes one first filter. In some embodiments, the second filter unit includes two or three second filters. In some embodiments, the third filter unit includes one to three third filters. In some embodiments, the fourth filter unit includes 4 to 14 fourth filters.

In some embodiments, the first average pore size is from about 50 nm to about 200 nm. In some embodiments, the second average pore size is from about 10 nm to about 50 nm. In some embodiments, the fourth average pore size is at most about 10 nm.

In some embodiments, the filtration medium in the first, second, third, or fourth filter includes polypropylene, high density polyethylene, ultra high molecular weight polyethylene, nylon, polytetrafluoroethylene, or a perfluoroalkoxy alkane polymer.

In some embodiments, the number of the second filters in the second filter unit is smaller than the number of the fourth filter in the fourth filter unit.

In some embodiments, the fourth average pore size is smaller than the second average pore size.

In some embodiments, the organic solvent includes cyclohexanone, ethyl lactate, 30 n-butyl acetate, propylene glycol monomethyl ether, propylene glycol monomethyl ether acetate, 4-methyl-2-pentanol, or propylene carbonate.

BRIEF DESCRIPTION OF THE DRAWING

FIG. 1 is a schematic diagram showing an example of a purification system adopted in a method of purifying an organic solvent in accordance with some embodiments of the present disclosure.

DETAILED DESCRIPTION OF THE DISCLOSURE

As defined herein, unless otherwise noted, all percentages expressed should be understood to be percentages by weight to the total weight of a composition. Unless otherwise noted, ambient temperature is defined to be between about 16 and about 27 degrees Celsius (° C.). The term "solvent" mentioned herein, unless otherwise noted, refers to a single solvent or a combination of two or more (e.g., three or four) solvents. In the present disclosure, "ppm" means "parts-per-million", "ppb" means "parts-per-billion" and "ppt" means "parts-per-trillion".

In general, the disclosure features systems and methods for purifying a solvent (e.g., an organic solvent). The solvent mentioned herein can be used as a wafer processing solution (such as a pre-wetting liquid, a developer solution, a rinsing solution, a cleaning solution, or a stripping solution), or a solvent for a semiconductor material used in a semiconductor manufacturing process.

Prior to being subjected to a purification method of the present disclosure, a solvent may contain an undesirable amount of contaminants and impurities. After the solvent is processed by the purification method of the present disclosure, substantial amounts of the contaminants and impurities can be removed from the solvent. A pre-processed solvent is also referred herein in the present disclosure as an "unpurified solvent". The pre-processed solvent can be synthesized in house or commercially available via purchasing from a supplier. A post-processed solvent is also referred in the present disclosure as a "purified solvent". A "purified solvent" may include impurities limited within predetermined ranges.

In general, the solvent mentioned herein can include at least one (e.g., two, three, or four) organic solvent. Examples of suitable organic solvents include methanol, ethanol, 1-propanol, isopropanol, n-propanol, 2-methyl-1-propanol, n-butanol, 2-butanol, tert-butanol, 1-pentanol, 2-pentanol, 3-pentanol, n-hexanol, cyclohexanol, 2-methyl-2-butanol, 3-methyl-2-butanol, 2-methyl-1-butanol, 3-methyl-1-butanol, 2-methyl-1-pentanol, 2-methyl-2-pentanol, 2-methyl-3-pentanol, 3-methyl-1-pentanol, 3-methyl-2-pentanol, 3-methyl-3-pentanol, 4-methyl-1-pentanol, 4-methyl-2-pentanol, 2-ethyl-1-butanol, 2,2-dimethyl-3-pentanol, 2,3-dimethyl-3-pentanol, 2,4-dimethyl-3-pentanol, 4,4-dimethyl-2-pentanol, 3-ethyl-3-heptanol, 1-heptanol, 2-heptanol, 3-heptanol, 2-methyl-2-hexanol, 2-methyl-3-hexanol, 5-methyl-1-hexanol, 5-methyl-2-hexanol, 2-ethyl-1-hexanol, methylcyclohexanol, trimethylcyclohexanol, 4-methyl-3-heptanol, 6-methyl-2-heptanol, 1-octanol, 2-octanol, 3-octanol, 2-propyl-1-pentanol, 2,6-dimethyl-4-heptanol, 2-nonanol, 3,7-dimethyl-3-octanol, ethylene glycol, propylene glycol, diethyl ether, dipropyl ether, diisopropyl ether, butyl methyl ether, butyl ethyl ether, butyl propyl ether, dibutyl ether, diisobutyl ether, tert-butyl methyl ether, tert-butyl ethyl ether, tert-butyl propyl ether, di-tert-butyl ether, dipentyl ether, diisoamyl ether, cyclopentyl methyl ether, cyclohexyl methyl ether, bromomethyl methyl ether, α,α-dichloromethyl methyl ether, chloromethyl ethyl ether, 2-chloroethyl methyl ether, 2-bromoethyl methyl ether, 2,2- dichloroethyl methyl ether, 2-chloroethyl ethyl ether, 2-bromoethyl ethyl ether, (±)-1,2-dichloroethyl ethyl ether, 2,2,2-trifluoroethyl ether, ethyl vinyl ether, butyl vinyl ether, allyl ethyl ether, allyl propyl ether, allyl butyl ether, diallyl ether, 2-methoxypropene, ethyl-1-propenyl ether, cis-1-bromo-2-ethoxyethylene, 2-chloroethyl vinyl ether, allyl-1,1,2,2-tetrafluoroethyl ether, octane, isooctane, nonane, decane, methylcyclohexane, decalin, xylene, ethylbenzene, diethylbenzene, cumene, sec-butylbenzene, cymene, dipentene, methyl pyruvate, monomethyl ether, propylene glycol monomethyl ether, propylene glycol monoethyl ether, propylene glycol monopropyl ether, propylene glycol monomethyl ether acetate, ethyl lactate, methyl methoxypropionate, cyclopentanone, cyclohexanone, n-butyl acetate, y-butyrolactone, diisoamyl ether, isoamyl acetate, chloroform, dichloromethane, 1,4-dioxane, hexyl alcohol, 2-heptanone, isoamyl acetate, propylene carbonate, and tetrahydrofuran.

In some embodiments, the solvent is a pre-wetting liquid. Examples of a pre-wetting liquid include at least one of cyclopentanone (CyPe), cyclohexanone (CyH), monomethyl ether, propylene glycol monomethyl ether (PGME), propylene glycol monoethyl ether (PGEE), propylene glycol monomethyl ether acetate (PGMEA), propylene glycol monopropyl ether (PGPE), and ethyl lactate (EL). In other embodiments, the solvent can be a developer solution such as n-butyl acetate, or a rinsing liquid such as 4-methyl-2-pentanol (MIBC).

In some embodiments, the pre-processed or unpurified organic solvent can have a purity of at least about 95% (e.g., at least about 96%, at least about 97%, at least about 98%, or at least about 99%). In some embodiments, the post-processed or purified organic solvent obtained from the methods described herein can have a purity of at least about 99.5% (e.g., at least about 99.9%, at least about 99.95%, at least about 99.99%, at least about 99.995%, or at least about 99.999%). As mentioned herein, "purity" refers to the weight percentage of the solvent in the total weight of the liquid. The content of the organic solvent in a liquid can be measured by using a gas chromatography mass spectrometry (GCMS) device.

In some embodiments, the boiling point of the solvent described herein is at most about 200° C. (e.g., at most about 150° C.) or at least about 50° C. (e.g., at least about 100° C.) from a point of improving manufacturing yield of a semiconductor chip. In this disclosure, the boiling point means a boiling point at 1 atm.

In general, impurities contained in a pre-processed organic solvent can include metallic impurities, particles, and others such as organic impurities and moisture.

As described herein, metal impurities can be in a form of a solid (e.g., metal simplex, particulate metal-containing compound, and the like). Examples of common metallic impurities include heavy metals such as iron (Fe), aluminum (Al), chromium (Cr), lead (Pb), and nickel (Ni), and ionic metals such as sodium (Na), potassium (K), and calcium (Ca). Depending on the type of metal, metal impurities can deteriorate oxide integrity, degrade MOS gate stacks, and reduce lifetime of devices. In an organic solvent purified by the methods described herein, the total trace metal content is preferred to be within a predetermined range of 0 to 300 ppt (e.g., 0 to 150 ppt) in mass.

In the present disclosure, substances having a size of 0.03 μm or greater are referred to as "particles" or "particulates". Examples of particles include dust, dirt, organic solid matters, and inorganic solid matters. The particles can also include impurities of colloidalized metal atoms. The type of the metal atoms that are easily colloidalized is not particularly limited, and can include at least one metal atom selected from the group consisting of Na, K, Ca, Fe, Cu, Mg, Mn, Li, Al, Cr, Ni, Zn, and Pb. In an organic solvent purified by the methods described herein, the total number of the particles having a size of 0.03 μm or more is preferred to be within a predetermined range of at most 100 (e.g., at most 80, at most 60, at most 50, at most 40, or at most 20) per 1 ml of the solvent. The number of "particles" in a liquid medium can be counted by a light scattering type in-liquid particle counter and is referred as LPC (liquid particle count).

As described herein, organic impurities are different from the organic solvent and refer to organic matters that are contained in the content of 5000 mass ppm or smaller with respect to the total mass of the liquid containing the organic solvent and the organic impurities. Organic impurities can be volatile organic compounds that are present in ambient air even inside a clean-room. Some of the organic impurities originate from the shipping and storage equipment, while some are presented in a raw material from the start. Other examples of organic impurities include a by-product generated when the organic solvent is synthesized and/or an unreacted reactant.

The total content of the organic impurities in a purified organic solvent is not particularly limited. From a point of improving the manufacturing yield of a semiconductor device, the total content of the organic impurities can be 0.1 to 5000 mass ppm (e.g., 1 to 2000 mass ppm, 1 to 1000 mass ppm, 1 to 500 mass ppm, or 1 to 100 mass ppm) in a purified organic solvent. The content of the organic impurities in the solvent described herein can be measured by using a gas chromatography mass spectrometry (GC-MS) device.

FIG. 1 is a schematic diagram showing a configuration of a purification system according to some embodiments of the present disclosure. As shown in FIG. 1, the purification system 10 includes a supply unit 20, a first filtration system 110, a storage tank 130, a second filtration system 120, and a packaging station 140, all of which are in fluid communication with each other (e.g., through one or more conduits).

In general, supply unit 20 (e.g., a tank) is configured to hold or transport a starting material (e.g., a pre-processed or unpurified organic solvent). The starting material can be processed by purification system 10 to produce or manufacture a purified organic solvent in which the number of unwanted contaminants (e.g., particulates, organic impurities, metallic impurities) are limited within predetermined ranges. The type of supply unit 20 is not particularly limited as long as it continuously or intermittently supplies the starting material to the other components of purification system 10. In some embodiments, supply unit 20 can include a material receiving tank, a sensor such as a level gauge (not shown), a pump (not shown), and/or a valve for controlling the flow of the starting material (not shown). In FIG. 1, purification system 10 includes one supply unit 20. However, in some embodiments, a plurality of supply units 20 can be provided (e.g., in parallel or series) for each type of starting materials to be processed by purification system 10.

Purification system 10 can include at least one first filtration system 110 and at least one second filtration system 120. In general, first filtration system 110 performs an initial filtration of the starting material (e.g., unpurified organic solvent) to remove the majority of the impurities and/or particles, and second filtration system 120 performs a subsequent filtration to remove the remaining impurities and fine particles to obtain a ultra-high purity organic solvent.

In some embodiments, purification system 10 can optionally include a temperature control unit 100 for setting or maintaining the temperature of the organic solvent within a certain temperature range such that the organic solvent is maintained at a substantially consistent temperature during the purification process. As described herein, a temperature control unit can include, but are not limited to, a commercial re-circulating heating/cooling unit, a condenser, or a heat exchanger, which can be installed, for example, on a conduit in purification system 10. Temperature control unit 100 can be configured, for example, between supply unit 20 and the first filtration system 110. In some embodiments, temperature control unit 100 can set the temperature of the organic solvent to at most about 80° F. (e.g., at most about 75° F., at most about 70° F., at most about 65° F., or at most about 60° F.) or and/or at least about 30° F. (e.g., at least about 40° F., at least about 50° F., or at least about 60° F.). In some embodiments, because pumps used in purification system 10 can generate heat and increase solvent temperature, purification system 10 can include additional temperature control unit (such as units 170 and 180 described below) at suitable locations to maintain the temperature of the solvent at a predetermined value.

Referring to FIG. 1, first filtration system 110 can include an optional temperature control unit 100, a supply port 110*a*, one or more (e.g., two, three, four, five, or ten) filter units (e.g., units 112, 114, and 116), an outflow port 110*b*, an optional recirculation conduit 160*h*, and one or more optional temperature control units 170, all of which are in fluid communication with each other (e.g., through one or more conduits).

In some embodiments, each filter unit in first filtration system 110 can include a filter housing and one or more (e.g., 2, 3, 4, 5, or 6) filters in the filter housing. Each filter can include a filtration medium having an average pore size. The filters can be arranged in parallel or in series in the filter housing. During use, when two filters are arranged in parallel, a solvent to be purified passes these two filters in parallel (i.e., substantially at the same time). On the other hand, when two filters are arranged in series, a solvent to be purified passes these two filters sequentially during use. In some embodiments, some filter units can include a plurality of filters in parallel in the filter housing to increase flow rate and improve productivity.

For example, first filtration system 110 shown in FIG. 1 includes three filter units (i.e., units 112, 114, and 116), each of which includes a filter housing and one or more filters (e.g., filters 112*a*, 114*a*, and 116*a*) in the filter housing. In other embodiments, first filtration system 110 can also include other purification modules (not shown) in addition to the three filter units shown in FIG. 1.

Referring to FIG. 1, filter unit 112 can include one or more filters 112*a* in the housing, filter unit 114 can include one or more filters 114*a* in the housing, and filter 116 can include one or more filters 116*a* in the housing, in which filters 112*a*, 114*a* and 116*a* can be different in functionality or property and offer different purification treatments. In some embodiments, certain filters (e.g., 112*a*, 114*a*, and 116*a*) accommodated within the corresponding filter units (e.g., 112, 114, and 116), respectively, can have the same or similar purification function, physiochemical properties, pore size and/or construction material. In some embodiments, each filter in a filter unit can independently be selected from the group consisting of a particle removal filter, an ion exchange filter, and an ion absorption filter.

In some embodiments, filter unit 112 (also referred to herein as the first filter unit) can include a filter housing (also referred to herein as the first housing) and at least one (e.g., two or three) filter 112*a* (also referred to herein as the first filter) in the filter housing. In some embodiments, when filter unit 112 includes two or more filters 112*a*, filters 112*a* can be arranged in parallel.

In some embodiments, filter 112*a* can be a particle removal filter to remove relatively large particles from the organic solvent. In some embodiments, filter 112*a* can include a filtration medium having an average pore size (also referred to herein as the first average pore size) of at most about 200 nm (e.g., at most about 180 nm, at most about 160 nm, at most about 150 nm, at most about 140 nm, at most about 120, or at most about 100 nm) and/or at least about 50 nm (e.g., at least about 60 nm, at least about 70 nm, at least about 80 nm, at least about 90 nm, or at least about 100 nm). Within the above range, it is possible to reliably remove foreign matters such as impurities or aggregates contained in the organic solvent while suppressing clogging of filter 112*a*.

Examples of suitable filtration materials of filter 112*a* include a fluoropolymer (e.g., polytetrafluoroethylene (PTFE), perfluoroalkoxy alkane polymers (PFA), or a modified polytetrafluoroethylene (MPTFE)), a polyamide resin such as nylon (e.g., nylon 6 or nylon 66), a polyolefin resin (including high density and ultrahigh molecular weight resins) such as polyethylene (PE) and polypropylene (PP). For example, the filtration medium in a particle removal filter can be made of at least one polymer selected from the group consisting of polypropylene (e.g., high density polypropylene), polyethylene (e.g., high density polyethylene (HDPE), or ultra high molecular weight polyethylene (UPE)), nylon, polytetrafluoroethylene, or a perfluoroalkoxy alkane polymer. A filter made of the above material can effectively remove foreign matters (e.g., those having high polarity) which are likely to cause residue defects and/or particle defects, and to efficiently reduce the content of the metal components in the chemical liquid. In some embodiments, filter unit 112 can include one filter 112*a* that has an average pore size of about 200 nm and is made from polypropylene.

In some embodiments, filter unit 116 (also referred to herein as the second filter unit) can include a filter housing (also referred to herein as the second housing) and at least two (e.g., three or four) filters 116*a* (also referred to herein as the second filter) in the housing. Filter 116*a* can be a particle removal filter to remove relative small particles from the organic solvent. In some embodiments, filter 116*a* can include a filtration medium having an average pore size (also referred to herein as the second average pore size) of at most about 50 nm (e.g., at most about 45 nm, at most about 40 nm, at most about 35 nm, at most about 30 nm, at most about 25, or at most about 20 nm) and/or at least about 10 nm (e.g., at least about 15 nm, at least about 20 nm, at least about 25 nm, or at least about 30 nm). In some embodiments, the average pore size of the filtration medium in filter 116*a* can be smaller than the average pore size of the filtration medium in filter 112*a*. In such embodiments, filters 116*a* can be used to remove particles smaller than those removed by filters 112*a*.

In some embodiments, filter 116*a* in filter unit 116 can include an ion absorption membrane to remove relative small particles and/or metal ions from the organic solvent. An ion adsorption membrane can have a porous membrane material and can have an ion exchange function. Examples of suitable materials that can be used to make an ion adsorption membrane include, but are not limited to, cellulose, diatomaceous earth, film material of microfiltration membrane such as a polyamide resin such as nylon (e.g., nylon 6 or nylon 66), polyethylene (e.g., high density polyethylene or ultra high molecular weight polyethylene), polypropylene, polystyrene, resin having imide group, resin having amide group and imide group, a fluororesin (e.g., polytetrafluoroethylene (PTFE), perfluoroalkoxy alkane polymers (PFA), or a modified polytetrafluoroethylene (MPTFE)), a membrane material having an ion exchange ability functional group introduced therein, or the like. For example, filters 116*a* can include at least one polymer selected from the group consisting of polypropylene (e.g., high density polypropylene), polyethylene (e.g., high density polyethylene, or ultra high molecular weight polyethylene), nylon, polytetrafluoroethylene, or a perfluoroalkoxy alkane polymer.

In some embodiments, at least some (e.g., all) of the filters 116*a* can be arranged in filter unit 116 in parallel and the remaining filters 116*a* in filter unit 116 (if any) can be arranged in series. When two filters are arranged in parallel, the organic solvent to be purified can go through the two filters in parallel (e.g., at the same time). In some embodiments, the number of filter 116*a* (e.g., those arranged in parallel) in filter unit 116 can be larger than the number of filter 112*a* in filter unit 112. For example, when filter unit 112 includes one filter 112*a*, filter unit 116 can have two or three filters 116*a* arranged in parallel. Without wishing to be bound by theory, it is believed that an advantage of having a larger number of filters in filter unit 116 arranged in parallel than the number of filters in filter unit 112 is that system 10 can accommodate an increased flow rate and have an improved productivity, or maintain the flow rate of system 10 without increasing the back pressure of the system. Without wishing to be bound by theory, it is believed that, when the average pore size of the filtration medium in filter 116*a* is smaller than the average pore size of the filtration medium in filter 112*a*, the flow rate of an organic solvent passing through filter 116*a* can be reduced compared to the flow rate of the organic solvent passing through filter 112*a*. Thus, it is believed that having a larger number of filters 116*a* arranged in parallel can increase the flow rate and productivity of system 10.

In some embodiments, filter unit 116 can include three filters 116*a* that are arranged in parallel, have an average pore size of about 50 nm, and are made from ultra high molecular weight polyethylene.

In some embodiments, purification system 10 can include an optional filter unit 114 (also referred to herein as the third filter unit). In some embodiments, filter unit 114 can include a filter housing (also referred to herein as the third housing) and at least one (e.g., two or three) filter 114*a* (also referred to herein as the third filter) in the filter housing. In some embodiments, at least some (e.g., all) of the filters 114*a* can be arranged in filter unit 114 in parallel and the remaining filters 114*a* (if any) can be arranged in series. In some embodiments, the number of filter 114*a* (e.g., those arranged in parallel) in filter unit 114 can be larger than the number of filter 112*a* in filter unit 112. For example, when filter unit 112 includes one filter 112*a*, filter unit 114 can have two or three filters 114*a* (e.g., arranged in parallel). Without wishing to be bound by theory, it is believed that an advantage of having a larger number of filters in filter unit 114 arranged in parallel than the number of filters in filter unit 112 is that system 10 can accommodate an increased flow rate and have an improved productivity, or maintain the flow rate of system 10 without increasing the back pressure of the system.

In some embodiments, filter 114*a* in filter unit 114 can be an ion exchange filter. For example, filter 114*a* can include one or more ion-exchange resin membranes to remove charged particles and/or metal ions from the organic solvent. The ion-exchange resin membrane used in the present disclosure is not particularly limited, and filters including an ion exchange resin having a suitable ion-exchange group immobilized to a resin membrane can be used. Examples of such ion-exchange resin membranes include strongly acidic cation-exchange resins having a cation-exchange group (such as a sulfonic acid group) chemically modified on the resin membrane. Examples of suitable resin membranes include those containing cellulose, diatomaceous earth, nylon (a resin having an amide group), polyethylene (e.g., high density polyethylene or ultra high molecular weight polyethylene), polypropylene, polystyrene, a resin having an imide group, a resin having an amide group and an imide group, a fluororesin (e.g., polytetrafluoroethylene or a perfluoroalkoxy alkane polymer), or a high-density polyethylene membrane. In some embodiments, the ion-exchange resin membrane can be a membrane having an integral structure of a particle-removing membrane and an ion-exchange resin membrane. Polyalkylene (e.g., PE or PP) membranes with an ion-exchange group chemically modified thereon are preferred. Cation-exchange groups are preferred as the ion-exchange group. Filters with ion-exchange resin membranes used in the present disclosure can be commercially available filters with metal ion removal functionality. These filters can be selected based on the ion exchange efficiency and have an estimated pore size in the range of about 100 nm to about 500 nm.

Examples of the shape of the membrane material include a pleated type, a flat membrane type, a hollow fiber type, a porous body as described in JP-A No. 2003-112060 and the like. As the ion exchange group to be introduced into the membrane material, it is preferable to use a combination of at least two of the cation exchange group, the chelate exchange group, and the anion exchange group to optimize the elution and selectivity of the components to be removed. Since the ion adsorption membrane has porosity, it is also possible to remove a part of the fine particles.

In some embodiments, filter unit 114 can include three filters 114*a* that are arranged in parallel, and are ion exchange filters made from polytetrafluoroethylene.

In some embodiments, first filtration system 110 can optionally include a recirculation conduit 160*h* to form a recirculation loop for recirculating a partially-purified organic solvent back to first filtration system 110 and to be processed by the filters in first filtration system 110 again. In some embodiments, the partially-purified organic solvent is recirculated at least two times (e.g., at least three times, at least four times, or at least five times) before the organic solvent is transferred to storage tank 130.

In general, storage tank 130 can be any suitable vessel for storing a chemical liquid. In some embodiments, storage tank 130 can have a suitable volume. For example, storage tank 130 can have a volume of at least about 1000 liters (e.g., at least about 2000 liters, at least about 3000 liters, or at least about 5000 liters) and/or at most about 30,000 liters (e.g., at most about 25,000 liters, at most about 20,000 liters, at most about 15,000 liters, or at most about 10,000 liters). In some embodiments, storage tank 130 does not include any stirrer or baffle.

In some embodiments, an optional temperature control unit 170 (e.g., a heat exchanger) can be configured along recirculation conduit 160*h*. In such embodiments, temperature control unit 170 can be configured at a temperature of at most about 80° F. (e.g., at most about 75° F., at most about 70° F., or at most about 65° F.) and/or at least about 30° F. (e.g., at least about 40° F., at least about 50° F., or at least about 60° F.) so that the temperature of the partially-purified organic solvent is maintained at about 80° F. or below as it is being recirculated back to first filtration system 110. In the examples as shown in FIG. 1, recirculation conduit 160*h* is configured at the upstream side of outflow port 110*b* of first filtration system 110. In some embodiments, recirculation conduit 160*h* can be configured at the downstream side of outflow port 110*b*. It is understood that pumps and valves may be installed at the various conduits, outflow ports and supply ports, supply unit 20, and temperature control unit 100 of first filtration system 110 as necessary.

As in the examples illustrated in FIG. 1, purification system 110 can optionally include a temperature control unit 170 (e.g., a heat exchanger) configured between filter unit 112 and filter unit 114 to control the temperature of the organic solvent to at most about 80° F. (e.g., at most about 75° F., at most about 70° F., or at most about 65° F.) and/or at least about 30° F. (e.g., at least about 40° F., at least about 50° F., or at least about 60° F.) before the organic solvent is charged into and processed in filter unit 114.

It should be noted also that the position of temperature control unit 170 is not limited to the examples shown above. In some embodiments, a temperature control unit 170 can be configured upstream of filter unit 112, between filter units 114 and 116, or downstream of filter unit 116. In such embodiments, another temperature control unit may or may not be installed downstream of filter unit 112 and prior to the entry of subsequent filter units (e.g., filter unit 114 and/or filter unit 116). Configuring another temperature control unit downstream of filter unit 112 is optional provided that no other means or equipment (e.g., a pump), which may re-introduce thermal energy into the organic solvent, is introduced or disposed between filter unit 112 and the subsequent filters (e.g., filter 114 or 116).

In some embodiments, filter units 112, 114, and 116 in first filtration system 110 may not include filter housings, and the filters 112*a*, 114*a*, and 116*a* can be configured un-compartmentalized in first filtration system 110. For example, first filtration system 110 can be a multistage system including replaceable filters (e.g., 112*a*, 114*a*, and 116*a*) that are concatenated together inside first filtration system 110, and the organic solvent can be caused to cascade through these filters. In such embodiments, a temperature control unit 170 can be configured at any position upstream of a first ion exchange filter or ion adsorption filter through which the organic solvent passes or cascades. For example, if first filtration system 110 houses, in sequence and downstream of its supply port 110*a*, particle removal filter A, particle removal filter B, ion exchange membrane A, ion exchange membrane B, and an ion adsorption membrane A, a temperature control unit 170 can be configured between particle removal filter B and ion exchange membrane A to have the temperature of the organic solvent adjusted and regulated to about 80° F. or below before the organic solvent passes through and is processed by the ion exchange membrane A, and by the subsequent ion exchange membrane B and an ion adsorption membrane A. It is noted that the above examples are for illustrative purposes and are not intended to be limiting.

As shown in FIG. 1, purification system 10 also includes a second filtration system 120, which is in fluid communication with and between storage tank 130 and packaging station 140. Second filtration system 120 can include a supply port 120*a*, one or more (e.g., two, three, four, five, or ten) filter units 122, an outflow port 120*b*, an optional recirculation conduit 160*f*, and one or more optional temperature control units 180, all of which are in fluid communication with each other (e.g., through one or more conduits). It is understood that pumps and valves may be installed at the various conduits, outflow ports and supply ports, and temperature control units in second filtration system 120 as necessary.

In some embodiments, filter unit 122 (also referred to herein as the fourth filter unit) can include a filter housing (also referred to herein as the fourth housing) and at least two filters 122*a* (also referred to herein as the fourth filter) in the filter housing. For example, filter unit 122 can include 3, 4, 5, 6, 7, 8, 9, 10, 11, 12, 13, or 14 filters 122*a* in the filter housing. Second filtration system 120 shown in FIG. 1 includes one filter unit 122. In some embodiments, second filtration system 120 can include two or more (e.g., three or four) filter units 122. In such embodiments, filter units 122 may not have separate housings, and filters 122*a* can be configured un-compartmentalized in second filtration system 120. In other embodiments, second filtration system 120 can also include other purification modules (not shown) in addition to filter unit 122.

In some embodiments, filters 122*a* can be different in functionality or property and offer different purification treatments. In some embodiments, filters 122*a* accommodated within filter unit 122 can have the same or similar purification function, physiochemical properties, pore size and/or construction material. In some embodiments, each filter 122*a* can independently be selected from the group consisting of a particle removal filter, an ion exchange filter, and an ion absorption filter.

In some embodiments, filter 122*a* can include ion absorption membranes (such as those described above with respect to filter 116*a*) to remove fine charged particles and/or metal ions in the organic solvent to be purified. In some embodiments, filter 122*a* can include a filtration medium having an average pore size (also referred to herein as the fourth average pore size) of at most about 10 nm (e.g., at most about 7 nm, at most about 5 nm, at most about 3 nm, or at most about 1 nm) and/or at least about 1 nm (e.g., at least about 3 nm, or at least about 5 nm). In some embodiments, filter 122*a* can both perform sieving functions (e.g., to remove fine particles) and ion-exchange functions (e.g., to remove charged particles and/or metal ions). In some embodiments, the average pore size of the filtration medium in filter 122*a* can be smaller than the average pore size of the filtration medium in filter 116*a*. In such embodiments, filter 122*a* can be used to remove particles smaller than those removed by filter 116*a*.

Examples of suitable materials that can be used in filter 122*a* include polypropylene (e.g., high density polypropylene), polyethylene (e.g., high density polyethylene, or ultra high molecular weight polyethylene), nylon (e.g., nylon 6 or nylon 66), polytetrafluoroethylene, or a perfluoroalkoxy alkane polymer. In some embodiments, filter 122*a*, as well as filters 112*a*, 114*a*, and 116*a* described above, can be made from a non-fluoropolymer.

In some embodiments, filters 122*a* (e.g., ion absorption filters) can have the same characteristics (e.g., the same pore size) except that they are made from a different material. For example, in some embodiments, when one filter 122*a* is made from a ultra high molecular weight polyethylene, another filter 122*a* can be made from a fluoropolymer (e.g., a PTFE). Without wishing to be bound by theory, it is believed that using a combination of filters 122*a* in which their filtration media are made from different materials can maximize the reduction of impurities, particles, and metal ions to obtain an ultra-high pure organic solvent.

In some embodiments, at least some (e.g., all) of the filters 122*a* can be arranged in filter unit 122 in parallel and the remaining filters 122*a* in filter unit 122 (if any) can be arranged in series. In some embodiments, the number of filter 122*a* (e.g., those arranged in parallel) in filter unit 122 can be larger than the number of filter 116*a* in filter unit 116. For example, when filter unit 116 includes three filters 116*a*, filter unit 122 can have four or more (e.g., six) filters 122*a* arranged in parallel. Without wishing to be bound by theory, it is believed that an advantage of having a larger number of filters in filter unit 122 arranged in parallel than the filters in filter unit 116 is that system 10 can accommodate an increased flow rate and have an improved productivity. Without wishing to be bound by theory, it is believed that, when the average pore size of the filtration medium in filter 122*a* is smaller than the average pore size of the filtration medium in filter 116*a*, the flow rate of an organic solvent passing through filter 122*a* can be reduced compared to the flow rate of the organic solvent passing through filter 116*a*. Thus, it is believed that having a larger number of filters 122*a* arranged in parallel can increase the flow rate and productivity of system 10.

In some embodiments, filter unit 122 can include six filters 122*a* that are arranged in parallel, have an average pore size of about 3 nm, and are made from ultra high molecular weight polyethylene.

Referring to FIG. 1, second filtration system 120 includes an optional recirculation conduit 160*f* to form a recirculation loop for recirculating a partially-purified organic solvent back to storage tank 130 and to be processed by filter unit 122 in second filtration system 120 again. In some embodiments, the partially-purified organic solvent is recirculated at least two times (e.g., at least three times, at least four times, or at least five times) before the purification process is completed and the organic solvent is transferred to packaging station 140. In some embodiments, without wishing to be bound by theory, it is believed that recirculating the partially-purified solvent through second filtration system 120 more than two times may not achieve further improvement in impurities removal. In the examples as shown in FIG. 1, recirculation conduit 160*f* is configured at the downstream side of outflow port 120*b* of second filtration system 120. In other examples, recirculation conduit 160*f* can be configured at the upstream side of outflow port 120*b*.

In some embodiments, second filtration system 120 can include one or more optional temperature control unit 180 (e.g., a heat exchanger) at any suitable place. For example, temperature control unit 180 can be configured along the recirculation conduit 160*f*. In some embodiments, temperature control unit 180 can be configured between supply port 120*a* and filter unit 122 and between filter unit 122 and outflow port 120*b*. In some embodiments, temperature control unit 180 can be configured at a temperature of at most about 80° F. (e.g., at most about 75° F., at most about 70° F., or at most about 65° F.) and/or at least about 30° F. (e.g., at least about 40° F., at least about 50° F., or at least about 60° F.) so that the temperature of the organic solvent in second filtration system 120 can be maintained at about 80° F. or below.

In some embodiments, packaging station 140 can be a mobile storage tank (e.g., a tank on a tanker) or a fixed storage tank. In some embodiments, packaging station 140 can be a fluoropolymer lined equipment (e.g., the inner surface of which can include a fluoropolymer such as a PTFE).

The present disclosure also features a method of purifying a solvent (e.g., an organic solvent). In general, the purification method can include passing the solvent through two or more (e.g., three or four) filter units in first and second filtration system 110 and 120. For example, referring to FIG. 1, an unpurified or pre-processed solvent (i.e., a starting material) can be purified by purification system 10 by passing the solvent from supply unit 20 through filter unit 112, optional filter unit 114, and filter unit 116 in first filtration system 110 to be collected in storage tank 130, and passing the solvent from storage tank 130 through filter unit 122 in second filtration system 120 to packaging station 140 (e.g., having a volume of from about 100 to 1000 liters). In some embodiments, the purification methods described herein can include recirculating the solvent through the recirculation loop in second filtration system 120 (e.g., through storage tank 130, filter unit 122, and recirculation conduit 160*f*) at least one time (e.g., two or three times) before transferring the purified solvent to packaging station 140. In some embodiments, the purification methods described herein can include recirculating the solvent through a recirculation loop in first filtration system 110 (e.g., through filter units 112, 114, and 116 and recirculation conduit 160*h*) at least one time (e.g., two or three times) before transferring the partially-purified solvent to storage tank 130.

In some embodiments, the unpurified or pre-processed solvent can include an organic solvent containing a metal element selected from the group consisting of sodium (Na), potassium (K), aluminum (Al), calcium (Ca), copper (Cu), iron (Fe), chromium (Cr), nickel (Ni), and lead (Pb). In some embodiments, the content of each metal component in the pre-processed solvent ranges from about 0.1 to 1000 mass ppt (e.g., 200 to 1000 mass ppt or 500 to 1000 mass ppt).

Referring to FIG. 1, when the pre-processed solvent reaches a temperature control unit (e.g., unit 100 or any subsequent temperature control unit such as units 170 and 180), the temperature of the solvent can be adjusted to a predetermined optimal temperature range (e.g., from 30° F. to 80° F., from 30° F. to 70° F., from 41° F. to 67° F., or from 50° F. to 65° F.). For example, the temperature of the solvent can be adjusted to 70° F., 68.5° F., or 67.5° F. In general, the temperature control unit can maintain or adjust the temperature of a solvent either at a particular location (e.g., before the entry of a filter) in purification system 10 or throughout the entire purification system 10.

When the number of particles and the amount of impurities detected from the purified solvent at the end of the processing by first and second filtration systems 110 and 120 are controlled within the predetermined ranges, an ultra-high purity solvent (e.g., containing 0.1 to 100 mass ppt of metal components, such as those selected from the group of metal elements consisting of iron (Fe), chromium (Cr), nickel (Ni) and lead (Pb)) is produced. Subsequently, the ultra-high purity solvent can be transferred to either packaging station 140 or to a manufacturing process for making a semiconductor article.

In some embodiments, the solvent purified by the methods and systems described herein can have a purity of at least about 99.5% (e.g., at least about 99.9%, at least about 99.95%, at least about 99.99%, at least about 99.995%, or at least about 99.999%). In some embodiments, the solvent purified by the methods and systems described herein can form a film or coating having an on-wafer particle count of at most about 500 (e.g., at most about 450, at most about 400, at most about 350, at most about 300, at most about 250, at most about 200, at most about 150, at most about 100, at most about 50 or at most about 25) or 0 on an entire wafer (e.g., a 12-inch wafer). In some embodiments, the solvent purified by the methods and systems described herein can form a film or coating having an on-wafer metal count (e.g., either a total on-wafer metal count or an on-wafer metal count of a specific metal such as Fe or Ni) of at most about 100 (e.g., at most about 90, at most about 80, at most about 70, at most about 60, at most about 50, at most about 40, at most about 30, at most about 20, or at most about 10) or 0 on an entire wafer (e.g., a 12-inch wafer). In some embodiments, the solvent purified by the methods and systems described herein can form a film or coating having an defect density (i.e., based on the total count of on-wafer metal and particles) of at most about 1.5 (e.g., at most about 1.4, at most about 1.2, at most about 1, at most about 0.8, at most about 0.6, at most about 0.5, at most about 0.4, at most about 0.2, at most about 0.1, at most about 0.07, at most about 0.05, at most about 0.03, at most about 0.02, at most about 0.01, at most about 0.007, at most about 0.005, at most about 0.004, at most about 0.003) or 0 per square centimeter on an entire wafer (e.g., a 12-inch wafer).

In some embodiments, the solvent can be purified by the methods and systems described herein at a relatively high flow rate. For example, the solvent can be purified at a flow rate (e.g., the flow rate through first filtration system 110 or the flow rate though second filtration system 120) at least about 25 L/min (e.g., at least about 30 L/min, at least about 40 L/min, at least about 50 L/min, at least about 60 L/min, at least about 80 L/min, at least about 100 L/min, or at least about 120 L/min) and/or at most about 170 L/min (e.g., at most about 160 L/min, at most about 150 L/min, at most about 140 L/min, at most about 130 L/min, at most about 120 L/min, at most about 110 L/min, or at most about 100 L/min). In general, the flow rate for purifying a solvent can vary depending on number of factors, including the nature and viscosity of the solvent to be purified, the temperature, the number of the filters (e.g., those arranged in parallel), the type and number of other equipment used in the purification process. Without wishing to be bound by theory, it is believed that the flow rate of the solvent to be purified cannot be too high to minimize defects on a wafer and to minimize buildup of static electric charges in the inner surface of a conduit or vessel, which can erode the conduit or vessel.

The present disclosure is illustrated in more detail with reference to the following examples, which are for illustrative purposes and should not be construed as limiting the scope of the present disclosure.

EXAMPLES

General Description of OWPC and OWMC Measurements

A solvent sample was collected and then inserted into a wafer coating tool. After a bare wafer was coated with a sample, the wafer was transferred to and inspected by a laser-based inspection system. By using a laser light, the laser-based inspection system detected, counted, recorded the location and sizes each particle on the wafer, at a detection limit of 19 nm. More specifically, counting targets included particles having a size of 19 nm or greater. The data was used to create wafer maps and provide the total on-wafer particle counts (OWPC).

The wafer was then transferred to be inspected by EDX (energy dispersive x-ray). Each particle reported by the laser-based inspection system was inspected by EDX (energy dispersive x-ray) for providing the elemental information. Any particle, which was found to produce any metal signal, was counted as a metal particle. The total number of particles with a metal signature was totalized to report as OWMP (on-wafer metal particle).

General Description of Total Trace Metal Measurement

The total trace metal concentration in each solvent sample was tested using ICP-MS (inductively coupled plasma mass spectrometry (ICP-MS). Using a Fujifilm developed method, each sample was tested for the presence of 26 metal species, the detection limit was metal specific, but the typical detection limits were in the range of 0.00010-0.030 ppb. The concentration of each metal species was then totalized to produce the value shown as total trace metal (ppb).

Example 1

N-butyl acetate was the solvent purified in this example. Referring to FIG. 1, n-butyl acetate was purified by using a purification system that included a supply unit 20, a first filtration system 110, a storage tank 130, a second filtration system 120. First filtration system 110 included a filter unit 112, a filter unit 114, and a filter unit 116. Filter unit 112 included one filter **112*a*, which was a 200 nm polypropylene filter. Filter unit 114 included three ion exchange filters 114*a* arranged in parallel and made from ultra high molecular weight polyethylene (UPE). Filter unit 116 included three filters 116*a* arranged in parallel and made from a 50 nm PTFE filter. Second filtration system 120 included a filter unit 122, which included six filters 122*a* arranged in parallel and made from UPE. No temperature control unit was used. Recirculation conduit 160*f* was used, but recirculation conduit 160*h*** was not used.

The test results are summarized in Table 1 below.

TABLE 1

| Contaminants | Unit | Amount in Raw Material | Amount in finished product |
|---|---|---|---|
| Aluminum | PPB | 0.051 | 0.028 |
| Calcium | PPB | 0.081 | 0.013 |
| Chromium | PPB | 0.031 | 0.009 |
| Copper | PPB | 0.035 | 0.005 |
| Iron | PPB | 0.417 | 0.008 |
| Lead | PPB | 0.026 | 0.004 |
| Nickel | PPB | 0.073 | 0.002 |
| Potassium | PPB | 0.043 | 0.009 |
| Sodium | PPB | 0.420 | 0.025 |
| Particles (>0.05 μm) | P/mL | >10,000 | 151 |
| Particles (>0.1 μm) | P/mL | >10,000 | 49 |
| Particles (>0.15 μm) | P/mL | >10,000 | 25 |
| Particles (>0.2 μm) | P/mL | >10,000 | 17 |
| Non-volatile organic residue | PPM | 0.018 | 0 |

As shown in Table 1, the amounts of all of the trace metal, particles, and non-volatile organic residues in the raw material (pre-purification) have been significantly reduced by using the above purification system.

While the invention has been described in detail with reference to certain embodiments thereof, it will be understood that modifications and variations are within the spirit and scope of that which is described and claimed.

What is claimed is:

1. A system, comprising:

a first filter unit, wherein the first filter unit comprises a first housing and at least one first filter in the first housing, and the first filter comprises a filtration medium having a first average pore size; and a second filter unit downstream of and in fluid communication with the first filter unit, wherein the second filter unit comprises a second housing and at least two second filters in the second housing, the at least two second filters are arranged in the second housing in parallel, and each of the second filters independently comprises a filtration medium having a second average pore size;

a fourth filter unit disposed downstream of the second filter unit, wherein the fourth filter unit comprises a fourth housing and at least two fourth filters in the fourth housing, the at least two fourth filters are arranged in the fourth housing in parallel, and each of the fourth filters independently comprises a filtration medium having a fourth average pore size;

wherein the number of the first filter in the first filter unit is smaller than the number of the second filters in the second filter unit, and the first average pore size is larger than the second average pore size; and wherein the number of the second filters in the second filter unit is smaller than the number of the fourth filter in the fourth filter unit.

2. The system of claim 1, wherein the first filter unit comprises one first filter.

3. The system of claim 1, wherein the filtration medium in the first filter comprises polypropylene, high density polyethylene, ultra high molecular weight polyethylene, nylon, polytetrafluoroethylene, or a perfluoroalkoxy alkane polymer.

4. The system of claim 1, wherein the first average pore size is from about 50 nm to about 200 nm.

5. The system of claim 1, wherein the second filter unit comprises two or three second filters.

6. The system of claim 1, wherein the filtration medium in the second filter comprises polypropylene, high density polyethylene, ultra high molecular weight polyethylene, nylon, polytetrafluoroethylene, or a perfluoroalkoxy alkane polymer.

7. The system of claim 1, wherein the second average pore size is from about 10 nm to about 50 nm.

8. The system of claim 1, further comprising a third filter unit disposed between the first and second filter units, wherein the third filter unit comprises a third housing and at least one third filter in the third housing, the third filter comprises a filtration medium having a third average pore size, and the filtration medium in the third filter comprises an ion exchange membrane.

9. The system of claim 8, wherein the third filter unit comprises one to three third filters.

10. The system of claim 8, wherein the ion exchange membrane in the third filter comprises polypropylene, high density polyethylene, ultra high molecular weight polyethylene, nylon, polytetrafluoroethylene, or a perfluoroalkoxy alkane polymer.

11. The system of claim 1, further comprising a storage tank downstream of and in fluid communication with the second filter unit.

12. The method of claim 11, wherein the system is configured to recirculate an organic solvent by moving the organic solvent from the storage tank to the first filter unit and passing the organic solvent through the first and second filter units.

13. The system of claim 1, wherein the fourth filter unit comprises 4 to 14 fourth filters.

14. The system of claim 1, wherein the fourth average pore size is smaller than the second average pore size.

15. The system of claim 1, wherein the fourth average pore size is at most about 10 nm.

16. The system of claim 1, wherein the filtration medium in the fourth filter comprises polypropylene, high density polyethylene, ultra high molecular weight polyethylene, nylon, polytetrafluoroethylene, or a perfluoroalkoxy alkane polymer.

17. The system of claim 1, wherein the system is configured to recirculate an organic solvent by moving the organic solvent exiting the fourth filter unit to a storage tank and subsequently passing the organic solvent through the fourth filter unit.

18. The system of claim 1, further comprising a packaging station disposed downstream of the fourth filter unit.

* * * * *